United States Patent
Karlsson et al.

(10) Patent No.: US 12,034,519 B2
(45) Date of Patent: Jul. 9, 2024

(54) METHOD AND SYSTEM FOR WIRELESS SATELLITE COMMUNICATION VIA LOW EARTH ORBIT (LEO) SATELLITES

(71) Applicant: Icomera AB, Gothenburg (SE)

(72) Inventors: Mats Karlsson, Vålberg (SE); Rikard Reinhagen, Gothenburg (SE)

(73) Assignee: Icomera AB, Gothenburg (SE)

( * ) Notice: Subject to any disclaimer, the term of this patent is extended or adjusted under 35 U.S.C. 154(b) by 308 days.

(21) Appl. No.: 17/556,562

(22) Filed: Dec. 20, 2021

(65) Prior Publication Data

US 2022/0200693 A1      Jun. 23, 2022

(30) Foreign Application Priority Data

Dec. 21, 2020   (SE) .................................. 2051518-5

(51) Int. Cl.
*H04B 7/185*      (2006.01)

(52) U.S. Cl.
CPC ..... *H04B 7/18513* (2013.01); *H04B 7/18506* (2013.01)

(58) Field of Classification Search
None
See application file for complete search history.

(56) References Cited

U.S. PATENT DOCUMENTS

| 7,020,708 B2 | 3/2006 | Nelson et al. |
| 10,374,692 B1* | 8/2019 | Banerian ................. H04B 7/19 |
| 10,566,683 B1* | 2/2020 | Campbell ................ H01Q 3/36 |
| 2014/0334379 A1 | 11/2014 | Lauer et al. |

FOREIGN PATENT DOCUMENTS

| EP | 3177074 A2 * | 6/2017 | .............. H04B 7/15 |
| EP | 3177074 A2 | 6/2017 | |
| EP | 3404848 A1 | 11/2018 | |
| WO | 2020023381 A1 | 1/2020 | |

OTHER PUBLICATIONS

Extended European Search Report for European Application No. 21215630.1, mailed May 9, 2022, (3 pages).
Swedish Office Action for Swedish Application No. 2051518-5, mailed Sep. 17, 2021, (10 pages).

* cited by examiner

*Primary Examiner* — Shripal K Khajuria
(74) *Attorney, Agent, or Firm* — Kagan Binder, PLLC

(57) ABSTRACT

A wireless satellite communication system for an aircraft comprises at least one router in the aircraft for communication with at least one terrestrial remote server through at least one external network comprising a plurality of low earth orbit, LEO, satellites. The router is arranged to establish connection with the remote server via the LEO satellites over at least two separate communication links, and the at least one terrestrial remote server at least comprises an aggregation server. The router is configured for receiving and transmitting wireless data to and from the aggregation server, using aggregated communication over the at least two separate communication links, the communication thereby at the end points appearing as a single link.

20 Claims, 3 Drawing Sheets

METHOD AND SYSTEM FOR WIRELESS SATELLITE COMMUNICATION VIA LOW EARTH ORBIT (LEO) SATELLITES

CROSS-REFERENCE TO RELATED APPLICATIONS

This application claims priority from Swedish Patent Application serial number 2051518-5, filed Dec. 21, 2020, titled "METHOD AND SYSTEM FOR WIRELESS SATELLITE COMMUNICATION VIA LOW EARTH ORBIT (LEO) SATELLITES," the disclosure of which is incorporated herein by reference in its entirety.

TECHNICAL FIELD OF THE INVENTION

The present invention relates to a method and system for wireless satellite communication between an aircraft and a terrestrial remote server through an external network comprising a plurality of low earth orbit (LEO) satellites.

BACKGROUND

There is an increasing demand from e.g. aircraft passengers to be able to communicate through mobile phones and other hand-held terminals while traveling, and also to access the Internet with laptop computers etc. However, the coverage, availability and performance of present air-to-ground communication is still poor. At present, communication with airborne aircrafts may occur through geostationary satellites, but the capacity of these satellites is limited, the latency is very high, and the data traffic cost is very high. Even communication with LEO satellites is limited in performance and coverage, and also severely limited by the frequent need for hand-overs between the satellites.

Thus, at the same time as the air-to-ground data communication performance is still very limited, there is a current rising trend of greater demand for communication capacity, due to e.g. increased use of streaming media, which requires far more data per minute of journey per passenger than older uses of the Internet, such as browsing text- and image-based sites like Facebook, or checking and responding to email.

There is therefore a need for an improved method and system for communicating with and from aircrafts, allowing increased capacity, capacity utilization, quality and/or cost-efficiency. Even though the above discussion is focused on aircrafts, similar situations and problems are encountered in many other types of moving vehicles, such as in ships.

SUMMARY OF THE INVENTION

It is therefore an object of the present invention to provide a wireless satellite communication method and system for aircrafts which alleviates all or at least some of the above-discussed drawbacks of the presently known systems.

This object is achieved by means of a wireless satellite communication method and system for an aircraft as defined in the appended claims.

According to one aspect of the invention, there is provided a wireless satellite communication system for an aircraft, the aircraft comprising:

at least one router in the aircraft for communication with at least one terrestrial remote server through at least one external network comprising a plurality of low earth orbit, LEO, satellites;

wherein the router is arranged to establish connection with the remote server via the LEO satellites over at least two separate communication links;

wherein the at least one terrestrial remote server at least comprises an aggregation server; and wherein the router is configured for receiving and transmitting wireless data to and from said aggregation server, using aggregated communication over said at least two separate communication links, the communication thereby at the end points appearing as a single link.

The "router" is a networking router, which is a machine that forwards data packets between networks, on at least one data link in each direction. The router may be a mobile access router, and preferably a mobile access and applications router.

The terrestrial remote server(s) may be any server or site accessible through an exterior mobile network, such as a DNS server, an ISP infrastructure gateway, an aggregation gateway, a content provider server of interest to aircraft passengers, or the like. For all common applications of this invention, the remote servers will constitute the Internet, but partly or purely private network applications are also feasible.

Low earth orbit (LEO) satellites are satellites operated in LEO, which is an earth-centered orbit with an altitude of 2000 km or less, and typically at 500-1200 km, such as at about 1000 km. Thus, LEO satellites operate at approximately $\frac{1}{3}$ of the radius of the earth or lower, and with at least 11.25 periods per day—i.e. with an orbital period of less than 128 minutes. Compared to conventional, geostationary satellites (which are typically at an altitude of 36,000 km), the LEO satellites require much lower energy and cost for satellite placement, and also have much lower latency, due to the relative closeness to the earth. In geostationary satellites, the latency is about 600 ms, whereas LEO satellites typically have a latency of 20-40 ms. On the other hand, LEO satellites have a relatively small momentary field of view, and are only able to observe and communicate with a fraction of the earth at a time. To this end, LEO satellites are operated in networks comprising a multitude of LEO satellites, so called constellations, in order to provide continuous coverage. Currently, several operators, such as SpaceX and OneWeb have operational LEO satellite communication constellations, with a continuous increase in operational LEO satellites in each of them, and several other operators, such as Amazon, Telesat and many others, are on their way of providing operational LEO satellite constellations. The new constellations are, or will be, mega-constellations, each comprising thousands of LEO-satellites.

In many LEO-satellite networks, such as in the SpaceX and OneWeb networks, communication between the satellites are often made in the Ka-band, whereas communication with user apparatuses are often made in the Ku-band. However, in some LEO-satellite networks, such as in the planned Telesat network, all communication is made in the Ka-band. Naturally, other communication bands are also feasible.

In each constellation, the LEO-satellites communicate with terrestrial base stations, which may in turn be connected to terrestrial communication networks. Further, the LEO-satellites may communicate between satellites, to forward data directly between them.

The present invention is based on the realization that much more efficient communication via LEO-satellites can be accomplished by using two, and preferably even more, simultaneous links. This can be used to distribute different data streams on different links to make better to increase capacity and performance of the communication. It may also be used for aggregated communication, where a data stream is divided into sub-streams, which are forwarded on different links, and then recombined in an aggregation server. Such aggregated communication also increases the overall capacity and performance, and also provides greatly improved reliability.

By the simultaneous use of multiple links, a much higher capacity is obtained compared to when only single links are used. The redundancy and reliability of the system is also improved, since the communication system will still be working even if a LEO-satellite is malfunctioning, if an operator is temporarily out of operation, and the like. The coverage is also greatly improved.

By the simultaneous use of multiple links, the communication may be controlled based on the varying characteristics of the links, such as packet loss (intermittent failure for packets of data to arrive), latency (round-trip response time, hence responsiveness), throughput (overall rate of data transmission, whether current or potential) and a variety of radiophysical metrics, such as signal strength. Said characteristics may be measured by the router, in order to distribute the data on the available links in an optimized way.

The present invention also alleviates the problems occurring at handovers between the satellites, since aircraft router will already be connected to at least one additional link during every handover.

With the present invention, data throughput rates to the aircrafts of 1 Gbit/s, or even higher, can be obtained.

Due to the greatly improved data capacity obtained by means of the present invention, it becomes possible to allow passengers to access media, such as streaming of films, from terrestrial sources, and to watch this on their own personal devices, such as tablets, smart phones or laptop computers. The need for inflight entertainment systems is hereby greatly reduced. Installation and maintenance of the inflight entertainment systems is at present very costly, and elimination of such systems would make great cost benefits. Thus, apart from offering improved internet access and the like, the present invention provides improved inflight entertainment, with increased flexibility and versatility, to a much lower overall cost, despite the increased cost for data transfer.

In the present invention, the network formed by the aircraft, the multiple and simultaneously useable LEO-satellites, and the terrestrial remote server, may be seen as a mesh network, where nodes non-hierarchically connect to many other nodes.

The aircraft is provided with a plurality of simultaneously useable directional satellite antennas, and preferably electronically steered patch array antennas, each antenna enabling a separate communication link. Since the distance to LEO-satellites is much smaller than to geostationary satellites, the antennas can be made very small, lightweight and affordable. For example, the antennas may of the size as a palm. This reduces the overall costs of the system, and also makes it possible to use many antennas on the aircraft. Thus, the aircraft may be provided with at least 2 simultaneously useable directional satellite antennas, and preferably at least 3. In one embodiment, the aircraft may be provided with at least 4 simultaneously useable directional satellite antennas, and preferably at least 5, and most preferably at least 6, such as 6-8 antennas. The antennas may be arranged on the roof of the aircraft, and may be arranged separated over at least the length of the aircraft, to reduce interference.

The router may be arranged to simultaneously communicate with LEO satellites via at least two operators, thereby providing separate communication links. By the use of multiple operators, the capacity is increased, and also the coverage, reliability and redundancy.

The router is preferably arranged to simultaneously communicate via at least two different LEO satellites, said at least two LEO satellites preferably being in communication with different terrestrial base stations. These LEO satellites may be operated by different operators. However, additionally or alternatively, the router may be arranged to simultaneously communicate via at least two different LEO satellites operated by the same operator. Such use of multiple satellites from the same operator will also increase capacity and redundancy, and will also further alleviate the problems related to handovers. It will also reduce the boresight problems often experienced when communication is made only through a single link.

In exemplary set-ups, there may be in total four antennas, for communication with two different operators, each on two different links, a 2×2 set-up, or there may be in total six antennas, communicating with three different operators, each on two different links, a 3×2 set-up, or communicating with two different operators, each on three different links, a 2×3 set-up. However, other alternatives are also feasible, such as 3×3, 2×4, 4×2, 4×3, 3×4, 2×1, 1×2 and the like.

One or more modem may be arranged to establish communication with each operator. Further, a modem may be connected to only one antenna, or be connected to two or more antennas. Thus, each communication link may be established over only one antenna, or over two or more antennas. Further, antennas may also be shared among several modems.

The router is preferably connected to an internal network on-board the aircraft, for connection to on-board client devices, and preferably a wireless internal network, and most preferably a wireless internal network operated in accordance with an IEEE 802.11 standard. To this end, one or more access points may be provided inside the aircraft, and be connected to the router via a wire, such as an ethernet cable, or through a wireless connection.

The router may be configured for receiving and transmitting wireless data to and from both said aggregation server, using aggregated communication over at least two separate links, and at least one other stationary communication server, using non-aggregated communication over a single link, and the router further being accessible by a plurality of client devices onboard said aircraft. Further, the system may comprise a controller within or connected to said router, said controller including at least one selection rule for selecting whether to use aggregated or non-aggregated communication, the controller being configured to determine, upon a request from a client device to communicate with one of said remote servers, whether one of said at least one rules applies, and to select using aggregated communication via said aggregation server or non-aggregated communication via said at least one other communication server for communication based on said determination.

Thus, it is possible to select which network traffic that is to be aggregated in the process of routing said traffic between the aircraft and terrestrial remote servers. It is determined, upon a request from a client device to access a resource on a remote server, whether that request should use aggregation. When aggregation should be used, routing of the request occurs through a specific stationary server—the aggregation server—whereas where aggregation should not be used, an "ordinary" wireless link is selected. Hereby, such non-aggregated traffic is conveyed more directly to its target server by routing it over the single link selected for this purpose.

This is based on the realization that most data streams are very short, whereas some data streams, such as voice over IP (VoIP) streams are long. Aggregation provides great advantages in respect of maintaining streams over a long period of time. The need for aggregation and ensuring that the streams are maintained are of great importance for such long streams, whereas this is of less need for shorter streams. For example, downloading an ordinary web page is typically made by downloading a plurality of separate streams. Should one of these streams fail, re-sending of that stream would be easily handled. However, should a VoIP stream be disrupted, the call would be aborted. Thus, by using aggregation for only certain streams, the overall performance of the communication system is greatly improved. Further, by using the aggregated communication only for certain streams, being in best need of the this performance, the capacity of this communication route is better used, and saved for the streams where it is of the best advantage.

Aggregation means that multiple wireless links are aggregated for simultaneous use by means of routing traffic on said links through a shared virtual connection to and from the gateway, which is a stationary computer acting as a server—an aggregation server—on the Internet. This method, hereinafter referred to as "aggregation", greatly improves the reliability of high-bandwidth wireless communication for aircrafts.

However, routing all traffic from an aircraft to a gateway may put a strain on the aggregation server, and in order to reduce this, at least some of the communication may be sent to other servers without aggregation. This maintains all the benefits and advantages of the aggregated communication, but in addition solves the bottleneck problem. Thus, great advantages in respect of enhanced bandwidth and other communication properties, lowered costs, and increased robustness.

Aggregation is the state and process whereby data streams between on-board clients and external stationary servers are jointly managed, preferably by a special protocol, between the router and the aggregation gateway/aggregation server. In reality, aggregated traffic passes through ISP infrastructure servers on its way to and from the aggregation gateway, but the virtual connection makes it appear to a third party, such as a web site, that all communications are taking place between that site and the aggregation gateway. This is advantageous because the aggregation gateway has a single, stable IP address and because streams of data can be moved from one physical link to another with minimal disruption, since the various links can be monitored both from the router and from the gateway.

The use of multiple parallel wireless links without aggregation, for non-aggregated communication, can be done by standards and common practices of IP networking. For example, a simple approach would be for the router to continuously loop over its connected links, assigning each request from a client on board to the link least recently given such an assignment. This is known as "round robin" routing. The selected link would convey the client's request to the target server and convey any response from the target server back to the router, which conveys said response back to the original client. From the point of view of the target server, it would appear to be communicating with the IP address of the selected link. The aggregation gateway would have no part in this communication whatsoever. The next request from any client would be handled by a different link and would therefore use a different IP address.

For a deeper discussion of selective routing, "data streams" are hereinafter defined as all communication with a specific combination of ultimate source and ultimate destination IP addresses and network ports, or whatever the equivalent of this would be in a networking scheme where these identifiers are not used or not sufficiently distinguishing. Such a stream is created when any entity on one side of the system seeks to communicate with any entity on the other side, using any specific combination of ports. A stream is deemed terminated after a period of inactivity which need not be closely defined, but will typically correspond to the session-ending 15-second timeout in the transmission control protocol (TCP). Renewed activity after termination, even if the source and destination are unchanged, constitutes a new stream for the purposes of this discussion.

In order to make a choice between aggregated and non-aggregated communication, each data stream can be analyzed and selected to be routed with aggregation or without aggregation based on the properties of each stream and on the availability of the aggregation gateway, in such a way as to optimize the load on the aggregation gateway's resources while also enabling the router to function in situations where the aggregation gateway cannot or should not be used at all. To this end, the router preferably has some information on the likely load on its aggregation gateway, either obtained directly, by communication with the gateway, or indirectly, by means of router configuration details which describe specific rules on what kind of streams to aggregate, what not to aggregate, or both.

In the event that a router observes its aggregation gateway to be entirely unreachable, or equivalently in the event that the gateway is too busy to provide adequate performance, the router may fall back to another aggregation gateway. In an embodiment, the router may, after having failed in its search for a functioning gateway, cease to aggregate traffic entirely until an adequate gateway connection has been established. This will cause the router to provide inferior performance, but it does enable the continued use of multiple concurrent links.

When an aggregation gateway is available, data streams will be selected for aggregation based primarily on the differing benefits of aggregating different types of traffic. The present invention is based on the realization that these needs for different types of traffic varies greatly, and by treating such traffic differently, great savings and much increased performance can be obtained. For example, an individual HTTP request made from a client browsing the web is likely to be brief, and one client's HTTP-based interaction with one web site is likely, but not guaranteed, to be unaffected by changes in the client's apparent public address from one individual request to another. Furthermore, HTTP traffic constitutes a large portion of passenger traffic. Therefore, excluding all HTTP requests from aggregation saves a relatively large amount of gateway load, while generally costing little in perceived performance. At the other end of the spectrum, a VPN connection is likely to be lengthy and sensitive to perturbations, such as changes in apparent IP address due to periods of poor coverage on one link or another. VPN connection data streams would therefore be among the last types of streams to be excluded from aggregation. They can be said to have a high need for aggregation, by virtue of the relative benefits they derive from aggregation.

The automatic analysis of data streams, for the purpose of categorization by need for aggregation, can take place by a variety of means, as discussed below. The subsequent or simultaneous selection of categorized streams to be aggregated will take place by rules akin to or identical to firewall rules. This can be arranged into a system such that categorization is numeric and directly comparable to the overall capacity for aggregation, with the effect that the level of aggregation performed can be adjusted in real time based on the measured gateway load and the volume of traffic at each level of need.

According to one embodiment, the at least one selection rule comprises a dynamic adjustment to current load on the aggregation server. Particularly, the load on the aggregation server may be estimated based on information received by direct communication with the aggregation server or indirectly, based on router configurations.

The at least one selection rule may comprise determining whether the requested resource involves a HTTP communication, and if so to assign non-aggregated communication for this communication. Additionally or alternatively, the at least one selection rule may comprise determining whether the requested resource involves a TCP communication a destination port of 80, and if so to assign non-aggregated communication for this communication. Additionally or alternatively, the at least one selection rule may comprise determining whether the requested resource involves a VPN communication, and is so to assign an aggregated communication for this communication.

Preferably, the at least one selection rule comprises determining the data stream type related to the requested resource, and assigning aggregated communication to data stream types of predetermined data stream types. The predetermined data stream types are preferably at least one of voice-over-IP (VOIP) and VPN. The data stream type may be determined based on deep packet inspection.

The router is preferably configured for receiving and transmitting wireless data to and from at least two stationary communication servers using non-aggregated communication, each over a single link, and wherein non-aggregated communication is assigned to said stationary communication server links based on a round-robin protocol.

When it is determined that there is a high load on the aggregation server, communication normally assigned to aggregated communication is preferably instead assigned to non-aggregated communication.

The router may further be configured for receiving and transmitting wireless data to and from at least two stationary communication servers using non-aggregated communication, each over a single link, and wherein the communication normally assigned to aggregated communication is assigned to non-aggregated communication links having the best characteristics.

According to another aspect of the invention, there is provided a method for wireless communication between an aircraft and at least one terrestrial remote server through at least one external network comprising a plurality of low earth orbit, LEO, satellites, the method comprising:
  providing at least two separate communication routes between the router and the remote server via the LEO satellites;
  communicating from said router with at least one terrestrial remote server being an aggregation server; and
  wherein the router is configured for receiving and transmitting wireless data to and from said aggregation server, using aggregated communication over said at least two separate communication links, the communication thereby at the end points appearing as a single link.

With this aspect of the invention, similar advantages and preferred features are present as in the previously discussed first aspect of the invention.

The at least one router provided in the aircraft may be configured for receiving and transmitting wireless data to and from both said aggregation server, using aggregated communication over at least two separate links, and at least one other stationary communication server, using non-aggregated communication over a single link, and the router further being accessible by a plurality of client devices onboard said aircraft. The method may comprise:
  providing at least one selection rule in said router for selecting whether to use aggregated or non-aggregated communication;
  determining, upon a request from a client device to communicate with one of said remote servers, whether one of said at least one rules applies; and
  selecting to use aggregated communication via said aggregation server or non-aggregated communication via said at least one other communication server for communication based on said determination.

The present invention is particularly useable and highly advantageous on aircrafts, but may also be used on other moving vehicles, and in particular moving passenger vehicles, such as ferries or other ships.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to an aircraft, such as an airplane or helicopter, is disclosed. However, it is to be acknowledged by the skilled reader that the method and system are correspondingly useable on other moving vehicles, such as ferries and other ships.

Figure 1:
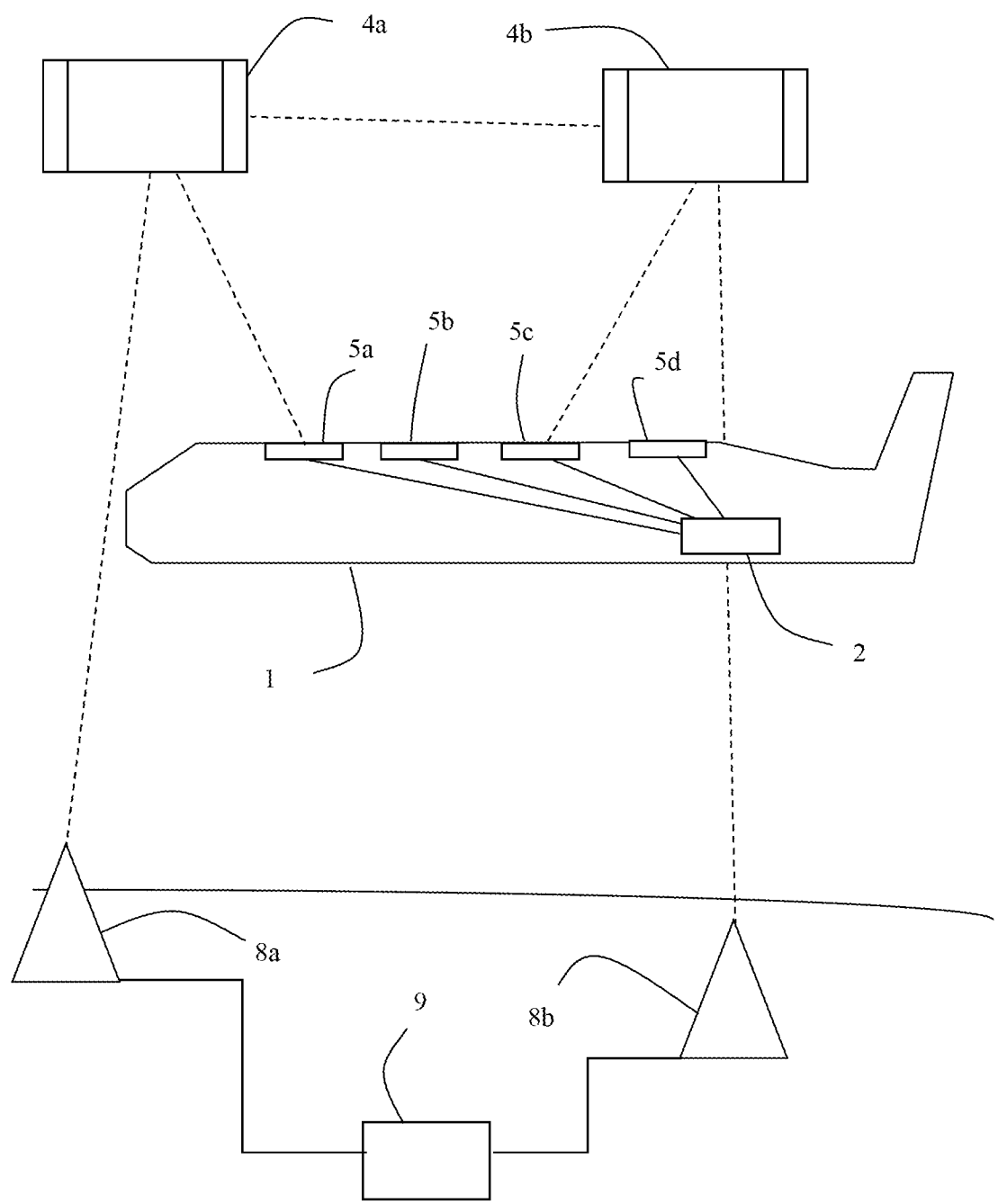
FIG. 1 is a schematic illustration of a wireless satellite communication system in accordance with an embodiment of the present invention.

In FIG. 1, a schematic illustration of a wireless satellite communication system is illustrated. The system comprises a router 2, arranged in an aircraft 1. In the illustrative embodiment, a single router is provided, but more than one router may also be provided.

The router in the aircraft is arranged to communicate with at least one terrestrial remote server 9 through at least one external network comprising a plurality of low earth orbit, LEO, satellites 4a, 4b. Further, the router is arranged to establish connection with the remote server 9 via the LEO satellites 4a, 4b over at least two simultaneously useable, separate communication links.

The LEO satellites may communicate between each other, and also communicates with terrestrial base stations 8a, 8b, connected to terrestrial networks, in turn connected to the remote server 9.

At least one of the terrestrial remote servers comprises an aggregation server, and the router is configured for receiving and transmitting wireless data to and from said aggregation server, using aggregated communication over said at least two separate communication links, the communication thereby at the end points appearing as a single link.

The network formed by the aircraft, the multiple and simultaneously useable LEO-satellites, and the terrestrial remote server, forms a mesh network, where nodes non-hierarchically connect to many other nodes.

Figure 3:
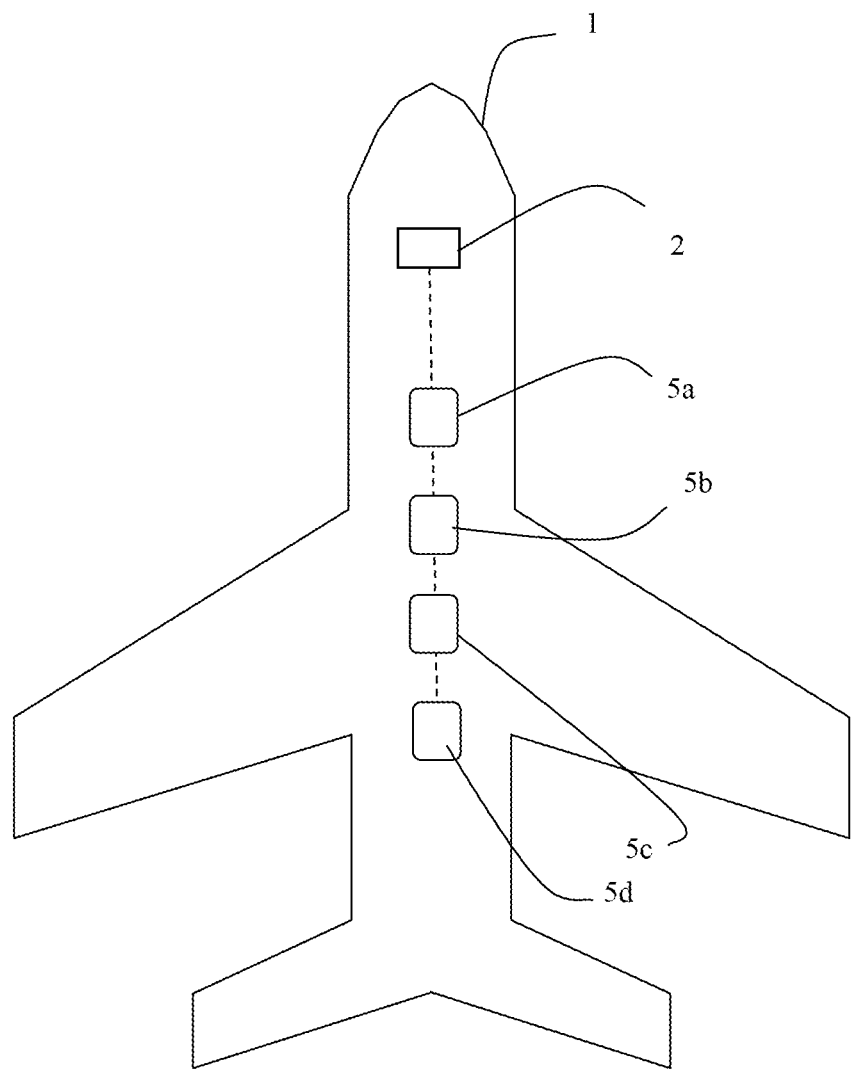
FIG. 3 is a schematic illustration of an aircraft in the wireless satellite communication system in FIGS. 1 and 2.

The aircraft is provided with a plurality of simultaneously useable directional satellite antennas 5a-d, and preferably electronically steered patch array antennas, each antenna enabling a separate communication link. In the illustrative example of FIG. 1, 4 simultaneously useable directional satellite antennas are provided, but fewer or more antennas may be used, such as at least 5, or at least 6. The antennas may be arranged on the roof of the aircraft, and may be arranged separated over at least the length of the aircraft, to reduce interference. This is further illustrated in FIG. 3.

Figure 2:
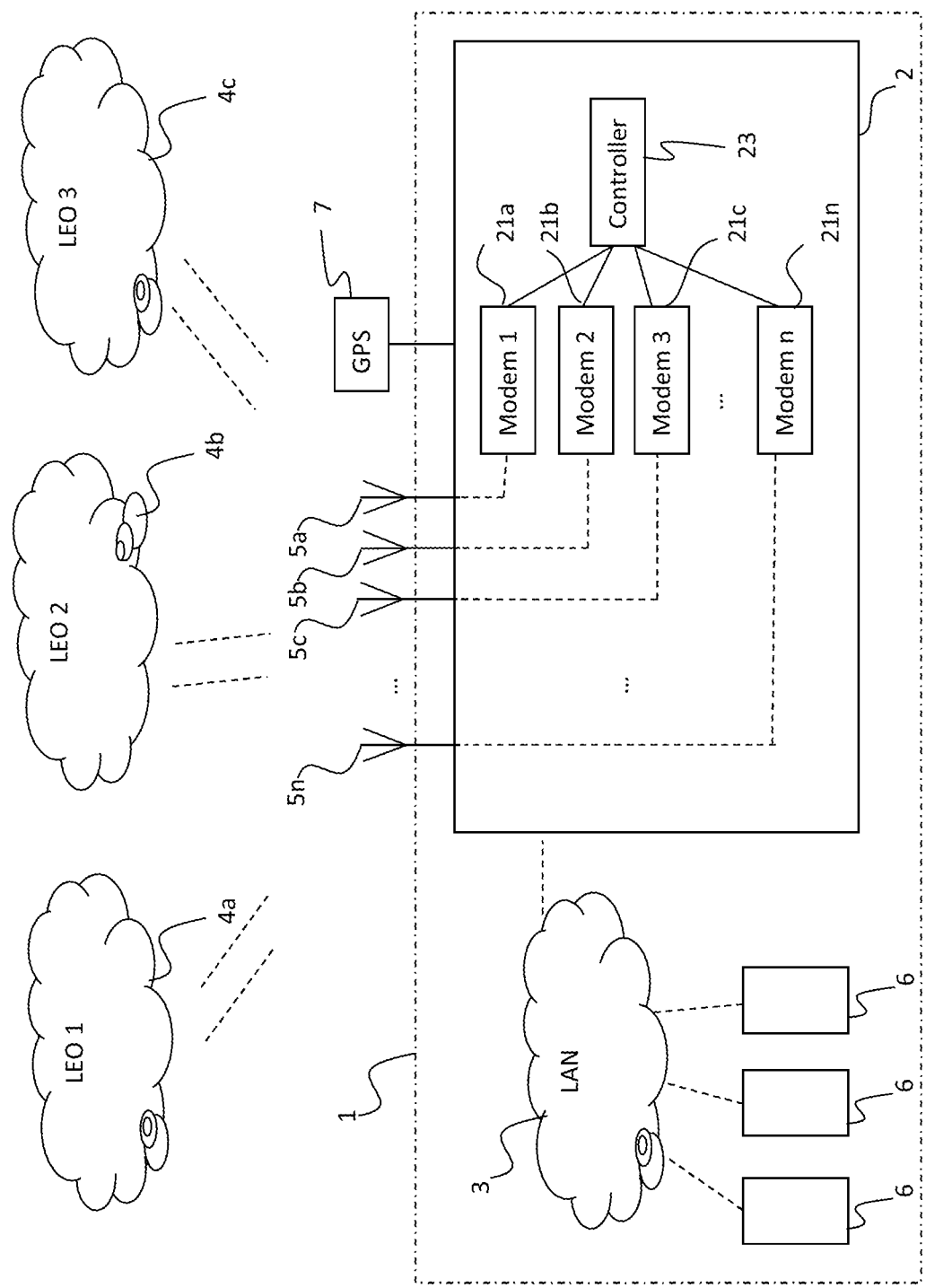
FIG. 2 is a more detailed block diagram of the wireless communication system of FIG. 1.

In FIG. 2 a schematic illustration of an aircraft 1 having a communication system is provided. The communication system comprises a data communication router 2 for receiving and transmitting data between an internal local area network (LAN) 3, and one or several LEO satellites 4a, 4b, 4c. Communication to and from the LEO satellites is provided through one or several antennas 5 *a-n* on the aircraft roof. Two or more data links are available between the aircraft and the LEO satellites.

The LAN is preferably a wireless network, using one or several internal antennas, or access points, to communicate with terminal units 6 within the aircraft. It is also possible to use a wired network within the aircraft. The LAN may be set-up as wireless access point(s), e.g. using an IEEE 802.11 standard (WiFi). The client(s) 6 may be computing devices such as laptops, mobile telephones, smart phones, PDAs and so on.

The data communication router comprises a plurality of modems 21 *a-n*. Assignment of data streams to different LEO satellites is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the aircraft, and wherein the controller may be arranged to assign data streams to various data links also partly in dependence on said received GPS signals.

The communication may use aggregated communication and/or non-aggregated communication.

We will now consider a variety of scenarios differing only in the reachability of the aggregation gateway GW.

In scenario I, the aggregation gateway GW is reachable and idle, such as being under 0-20% load. In this scenario, it is economically efficient for the router to construct a virtual connection to GW and assign all traffic from one LEO satellite, C1, and a second LEO satellite, C2, to the virtual connection. This creates a load on GW, including a load on overall site bandwidth as well as server CPU etc.

In scenario II, GW is reachable but under some load, such as being under 20-70% load, or 30-60% load, such as under 40% load, from other routers. The virtual connection can still be created and will be stable.

In scenario III, GW is reachable but under heavy load, such as under 60-99% load, or 80-99% load, such as 95% load. The virtual connection may be intermittent as a result of CPU bottlenecks or network congestion at the gateway site.

In scenario IV, GW is not responding, e.g. due to overload (100% load), or being subject to power breakdown, having been hacked by a hostile agent, or for other reasons being permanently or temporarily unreachable. Here, there will be no virtual connection.

In one possible embodiment of the present invention, the router is configured to aggregate all client traffic except TCP traffic with a destination port of 80. The router has a firewall rule carrying out the analysis of client traffic to identify all such packets. This is an attractive solution because the firewall rule produces very little overhead. Round-robin routing of the unaggregated traffic, where the LEO satellite links take turns handling each new data stream, is also cheap in terms of CPU cycles. In the example of a Linux-based router, round robin can be achieved using a "nexthop" function in the operating system kernel. However, not all TCP traffic on port 80 is actually HTTP traffic, and some HTTP traffic, such as large file downloads, stands to benefit from aggregation, so the simplicity of this embodiment does come with some drawbacks. Round-robin routing may also, in some situations, lead to poor performance if the streams assigned to one of the LEO satellites turn out to be much larger than those assigned to another LEO satellite. There would be underutilized bandwidth on the second LEO satellite. The aggregated traffic could be placed more intelligently to compensate, as is per se known. In any case, this simplistic embodiment alleviates the load on the gateway in scenarios I and II, without degrading performance too badly.

In a more preferable embodiment, the router runs packet inspection software or talks to an external packet sniffer to analyze client traffic on a deeper level, purely for the purpose of aggregation triage. Packet inspection would make it possible to identify a variety of traffic types in need of aggregation or other special treatment such as the aforementioned VPN tunnels or voice-over-IP (VOIP) connections. VOIP, conveying the human voice in real time, is sensitive to latency and should therefore be routed with special consideration for latency, such as can more easily be obtained with aggregation than without it. With such an embodiment, it would be possible to aggregate only those types of traffic in particular need of aggregation, and route everything else away from GW by default. This would greatly alleviate the load on GW, ideally to the point of allowing the virtual connection to remain useful for special needs in scenario III.

A variety of routing schemes for unaggregated traffic can be used in an embodiment. The various link characteristics measurable by the router can be taken into account in such routing schemes. For example, in scenario IV, VOIP cannot be aggregated, but it would still be possible to analyze the available links so that VOIP traffic is routed, unaggregated, over whichever link has the lower (i.e. better) latency value. In general, the traffic most in need of aggregation would have preferential treatment in scenario IV, being assigned to links with better characteristics, while other traffic is assigned to inferior links.

In a preferred embodiment, the router adjusts which types of traffic are aggregated depending on the circumstances. In scenario I, for example, the router would aggregate everything, while in scenario II it would cease to aggregate the downloading of ordinary web pages and images, as detected by relatively simple HTTP header inspection. In scenario III the router would aggregate only the most needful data streams using deep packet inspection, and finally, in scenario IV, the router would aggregate nothing, instead routing all traffic, including DNS lookups, directly onto the links until a gateway connection can be reestablished. This embodiment would make the router highly responsive and resilient, but less predictable than the alternative embodiments discussed above.

The invention has now been described with reference to specific embodiments. However, several variations of the communication system are feasible. For example, any number of parallel links may be used, both for the aggregated communication and the non-aggregated communication. Further, the control unit may be integrated with the router, and e.g. be realized by software within the controller of the router, or be arranged as one or several separate unit(s) connected to the router. Further, the communication system may be used on various types of vehicles. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

What is claimed is:

1. A wireless satellite communication system for a moving vehicle, the moving vehicle comprising:
   at least one router in the moving vehicle for communication with at least one terrestrial remote server through at least one external network comprising a plurality of low earth orbit, LEO, satellites;
   wherein the moving vehicle is provided with a plurality of simultaneously useable directional satellite antennas, each antenna enabling a separate communication link with said LEO satellites;
   wherein the router is arranged to establish connection with the remote server via the LEO satellites over at least two separate communication links;
   wherein the at least one terrestrial remote server at least comprises an aggregation server; and
   wherein the router is configured for receiving and transmitting wireless data to and from said aggregation server, using aggregated communication over said at least two separate communication links, the communication thereby at the end points appearing as a single link.

2. The wireless satellite communication system of claim 1, wherein the router is configured for receiving and transmitting wireless data to and from both said aggregation server, using aggregated communication over at least two separate links, and at least one other stationary communication server, using non-aggregated communication over a single link, and the router further being accessible by a plurality of client devices onboard said moving vehicle.

3. The wireless satellite communication system of claim 2, further comprising a controller within or connected to said router, said controller including at least one selection rule for selecting whether to use aggregated or non-aggregated communication, the controller being configured to determine, upon a request from a client device to communicate with one of said remote servers, whether one of said at least one rules applies, and to select using aggregated communication via said aggregation server or non-aggregated communication via said at least one other communication server for communication based on said determination.

4. The wireless satellite communication system of claim 1, wherein the simultaneously useable directional satellite antennas are electronically steered patch array antennas.

5. The wireless satellite communication of claim 1, wherein the moving vehicle is provided with at least 3 simultaneously useable directional satellite antennas.

6. The wireless satellite communication of claim 1, wherein the moving vehicle is provided with at least 5 simultaneously useable directional satellite antennas.

7. The wireless satellite communication system of claim 1, wherein the router is arranged to simultaneously communicate with LEO satellites via at least two operators, thereby providing separate communication links.

8. The wireless satellite communication system of claim 1, wherein the router is arranged to simultaneously communicate via at least two different LEO satellites.

9. The wireless satellite communication system of claim 1, wherein the router is arranged to simultaneously communicate via at least two different LEO satellites, said at least two LEO satellites being in communication with different terrestrial base stations.

10. The wireless satellite communication system of claim 8, wherein the router is arranged to simultaneously communicate via at least two different LEO satellites operated by the same operator.

11. The wireless satellite communication system of claim 1, wherein the router is further connected to an internal network on-board the moving vehicle, for connection to on-board client devices.

12. The wireless satellite communication system of claim 1, wherein the internal network on-board the moving vehicle is a wireless internal network, operated in accordance with an IEEE 802.11 standard.

13. The wireless satellite communication system of claim 1, wherein the router is arranged to automatically separate the communication traffic between the at least two separate communication links based on specific optimization conditions.

14. The wireless satellite communication system of claim 13, wherein the specific optimization conditions comprise at least one of: price, latency and speed.

15. The wireless satellite communication system of claim 1, wherein the moving vehicle is an aircraft.

16. A method for wireless communication between a moving vehicle and at least one terrestrial remote server through at least one external network comprising a plurality of low earth orbit, LEO, satellites, the method comprising:
   providing at least two separate communication links between the router and the remote server via the LEO satellites via a plurality of simultaneously useable directional satellite antennas at the moving vehicle;

communicating from said router with at least one terrestrial remote server being an aggregation server; and wherein the router is configured for receiving and transmitting wireless data to and from said aggregation server, using aggregated communication over said at least two separate communication links, the communication thereby at the end points appearing as a single link.

17. The method of claim 16, wherein at least one router provided in the moving vehicle is configured for receiving and transmitting wireless data to and from both said aggregation server, using aggregated communication over at least two separate links, and at least one other stationary communication server, using non-aggregated communication over a single link, and the router further being accessible by a plurality of client devices onboard said moving vehicle.

18. The method of claim 17, wherein the method comprises:
    providing at least one selection rule in said router for selecting whether to use aggregated or non-aggregated communication;
    determining, upon a request from a client device to communicate with one of said remote servers, whether one of said at least one rules applies; and
    selecting to use aggregated communication via said aggregation server or non-aggregated communication via said at least one other communication server for communication based on said determination.

19. The method of claim 16, wherein the moving vehicle is an aircraft.

20. A wireless satellite communication system for an aircraft, the aircraft comprising:
    at least one router in the aircraft for communication with at least one terrestrial remote server through at least one external network comprising a plurality of low earth orbit, LEO, satellites;
    wherein the moving vehicle is provided with a plurality of simultaneously useable directional satellite antennas, each antenna enabling a separate communication link with said LEO satellites;
    wherein the router is arranged to establish connection with the remote server via the LEO satellites over at least two separate communication links;
    wherein the at least one terrestrial remote server at least comprises an aggregation server; and
    wherein the router is configured for receiving and transmitting wireless data to and from said aggregation server, using aggregated communication over said at least two separate communication links, the communication thereby at the end points appearing as a single link.

* * * * *